United States Patent
Tseng

(10) Patent No.: US 6,625,001 B2
(45) Date of Patent: Sep. 23, 2003

(54) DIRECTIONAL TAP

(75) Inventor: Micki Tseng, Chung-Ho (TW)

(73) Assignee: Cable Vision Electronics Co., Ltd., Taipei Hsien (TW)

( * ) Notice: Subject to any disclaimer, the term of this patent is extended or adjusted under 35 U.S.C. 154(b) by 93 days.

(21) Appl. No.: 10/052,116

(22) Filed: Jan. 17, 2002

(65) Prior Publication Data

US 2002/0176218 A1 Nov. 28, 2002

(30) Foreign Application Priority Data

May 23, 2001 (TW) .................................. 90208444 U

(51) Int. Cl.⁷ ................................................. H02H 9/06
(52) U.S. Cl. ............................ 361/119; 361/48; 361/56; 361/91.1; 361/127
(58) Field of Search .............................. 361/119, 48, 56, 361/91.1, 127, 117, 118, 120, 126

(56) References Cited

U.S. PATENT DOCUMENTS 4,918,565 A * 4/1990 King
5,570,263 A * 10/1996 Dion et al.
5,991,139 A * 11/1999 Kamali et al.
6,222,717 B1 * 4/2001 Waas et al.
6,243,247 B1 * 6/2001 Akdag et al.
6,369,999 B1 * 4/2002 Wihlgemuth et al.

* cited by examiner

Primary Examiner—Dean A. Reichard
Assistant Examiner—Ha Nguyen
(74) Attorney, Agent, or Firm—Trop, Pruner & Hu, P.C.

(57) ABSTRACT

In a directional tap, a splitting circuit receives a video signal from an input port and outputs a distributed video signal corresponding to the video signal from the input port at each of multiple directional output ends. Each of multiple directional output terminals is connected electrically to a respective one of the directional output ends for outputting the distributed video signal to a client end. One of multiple surge protection circuit units is connected between the input port and an input of the splitting circuit. The remaining surge protection circuit units are connected between a respective directional output end of the splitting circuit and a respective directional output terminal. Each surge protection circuit unit includes an inductor having a first terminal connected electrically to the splitting circuit, and a second terminal cooperating with a ground terminal to define a gap.

3 Claims, 3 Drawing Sheets ic # DIRECTIONAL TAP

CROSS-REFERENCE TO RELATED APPLICATION

This application claims priority of Taiwan patent Application No. 090208444, filed on May 23, 2001.

BACKGROUND OF THE INVENTION

1. Field of the Invention

The invention relates to a directional tap, more particularly to a directional tap with a surge protection capability.

2. Description of the Related Art

FIG. 1 illustrates a conventional directional tap 1 that includes a base 11, a splitting circuit board 12 disposed in the base 11, and a cover 10 mounted removably on the base 11. The base 11 is formed with input and output ports 110, 112. The input port 110 is provided with an input connector 13. The output port 112 is provided with an output connector 14. The input and output ports 110, 112 are connected electrically to a cable television network via cables 20 for receiving and outputting a video signal. The cover 10 is formed with a plurality of directional output terminals 100, each of which is connected to a client end via a respective cable 21 for outputting a distributed video signal from the splitting circuit board 12 and corresponding to the video signal received at the input port 110.

The conventional directional tap 1, which is generally installed in outdoors, may experience a voltage surge when lightning strikes. It is noted that a surge voltage larger than 2 KV and present in the video signal and the distributed video signal can result in damage to the conventional directional tap. In a conventional directional tap, a varistor, a bi-directional switch, a gas tube or the like is used to bypass surge voltages present in the video signal and the distributed video signal for surge protection. For example, an inexpensive varistor (about 0.5 USD/piece) has an instantaneous current load of about 100 Amps, whereas an expensive varistor (about 10 USDs/piece) has an instantaneous current load of about 3000 Amps or more. As such, the surge protection effect depends on the price of the varistor. In order to provide superior surge protection, the conventional directional tap encounters the drawback of relatively high costs.

SUMMARY OF THE INVENTION

Therefore, the object of the present invention is to provide a directional tap that offers a surge protection function at a relatively low cost.

According to the present invention, a directional tap comprises:

input and output ports adapted to be connected electrically to a cable television network for receiving and outputting a video signal;

a splitting circuit having an input connected electrically to the input port, an output connected electrically to the output port, and a plurality of directional output ends, the splitting circuit receiving the video signal from the input port and outputting a distributed video signal corresponding to the video signal from the input port at each of the directional output ends;

a plurality of directional output terminals, each of which is connected electrically to a respective one of the directional output ends for outputting the distributed video signal to a client end; and a plurality of surge protection circuit units, one of which is connected between the input port and the input of the splitting circuit, the remaining ones of which are connected between a respective one of the directional output ends of the splitting circuit and a respective one of the directional output terminals, the surge protection circuit units bypassing surge voltages present in the video signal and the distributed video signal, each of the surge protection circuit units including an inductor having a first terminal connected electrically to the splitting circuit, and a second terminal cooperating with a ground terminal to define a gap.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
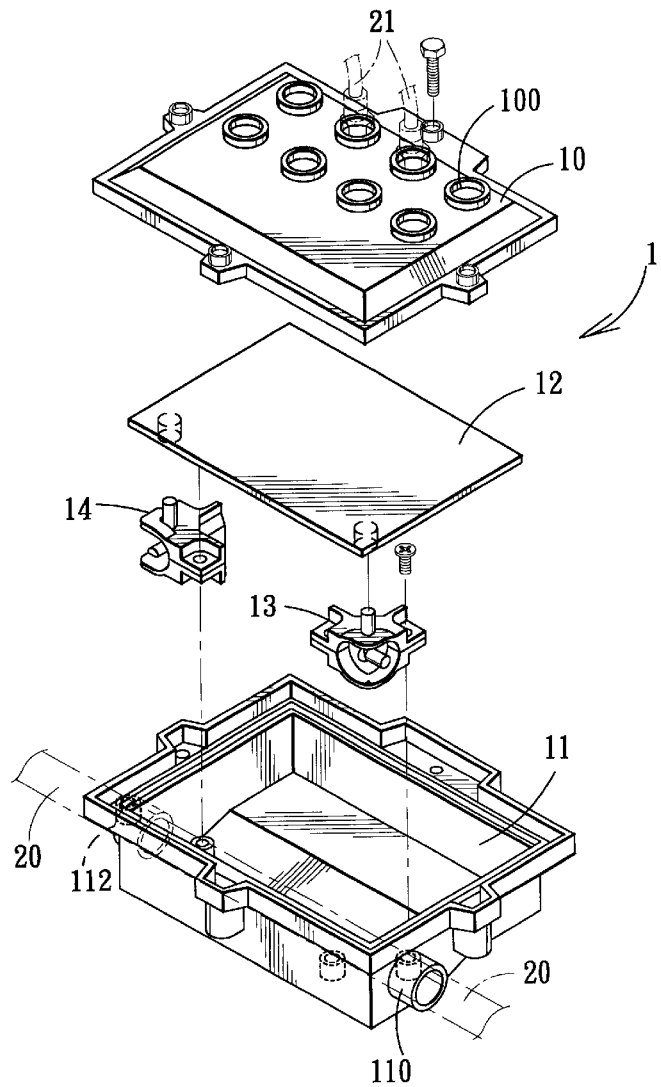
FIG. 1 is an exploded perspective view of a conventional directional tap.
Figure 2:
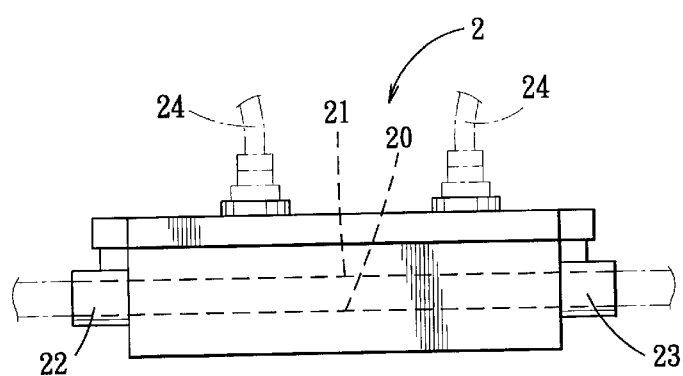
FIG. 2 is a schematic side view showing the preferred embodiment of a directional tap according to the present invention.
Figure 3:
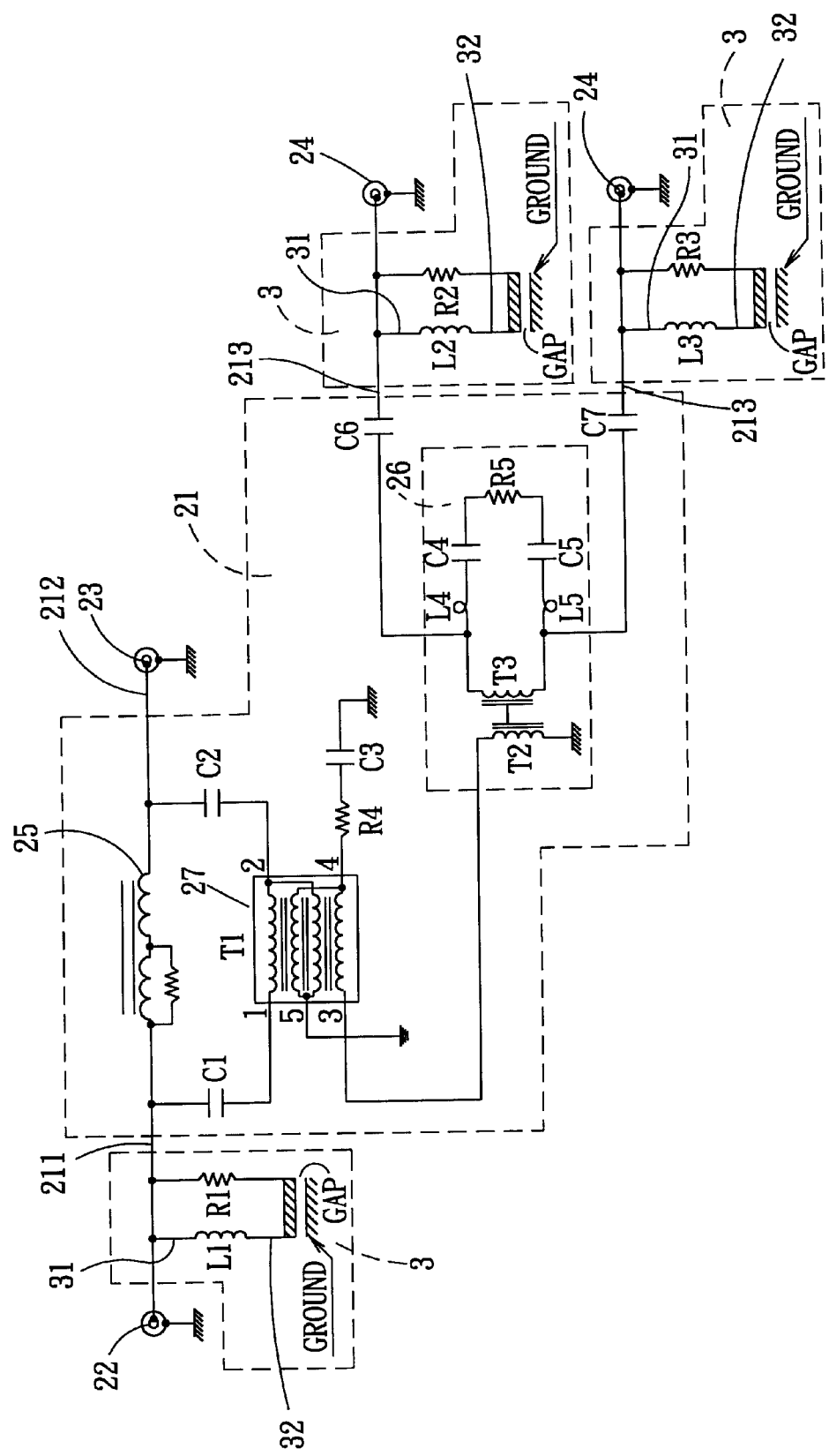
FIG. 3 is a schematic electrical circuit diagram illustrating the preferred embodiment.

Referring to FIGS. 2 and 3, the preferred embodiment of a directional tap 2 according to the present invention is shown to include input and output ports 22, 23, a splitting circuit 21, a plurality of directional output terminals 24, and a plurality of surge protection circuit units 3.

The input and output ports 22, 23 are adapted to be connected electrically to a cable television network (not shown) for receiving and outputting a video signal in a conventional manner.

The splitting circuit 21 has an input 211 connected electrically to the input port 22, an output 212 connected electrically to the output port 23, and a plurality of directional output ends 213. In this embodiment, the splitting circuit 21 has two directional output ends 213. However, the number of the directional output ends 213 is not limited to two, and the splitting circuit 21 of the present invention can also be configured to have four/eight/ten/sixteen directional output ends. The splitting circuit 21 receives the video signal from the input port 22 and outputs a distributed video signal corresponding to the video signal from the input port 22 in a known manner at each of the directional output ends 213. The splitting circuit 21 includes a low-pass RF choke 25, capacitors (C1, C2), a coupler 27 and a splitter 26. The cable television network has a power signal (60~90 VDC or VAC) and a RF signal, such as the video signal, transmitted therein. The power signal from the input port 23 passes through the RF choke 25 and is outputted to a succeeding directional tap (not shown) in the cable television network via the output port 23. The RF signal passes through first and second paths. In the first path, the video signal from the input port 22 passes through the capacitor (C1), the coupler 27 and the capacitor (C2) and is outputted to the succeeding directional tap via the output port 23. In the second path, the video signal passes through the capacitor (C1), the coupler 27 and the splitter 26 so as to output the distributed video signal in a known manner at each of the directional output ends 213.

In this embodiment, two directional output terminals 24 are in use. Each of the directional output terminals 24 is connected electrically to a respective one of the directional output ends 213 for outputting the distributed video signal to a client end (not shown).

In this embodiment, three surge protection circuit units 3 are in use. One of the surge protection circuit units 3 is connected between the input port 22 and the input 211 of the splitting circuit 21. Each of the remaining surge protection circuit units 3 is connected between a respective one of the directional output ends 213 of the splitting circuit 21 and a respective one of the directional output terminals 24. The surge protection circuit units 3 bypass surge voltages present in the video signal and the distributed video signal. Each of the surge protection circuit units 3 includes an inductor (L1, L2, L3) having a first terminal 31 connected electrically to the splitting circuit 21, and a second terminal 32 cooperating with a ground terminal (GROUND) to define a gap (GAP). Preferably, the gap (GAP) is a 1.2±0.5 mmgap. As such, when the video signal or the distributed video signal with a surge voltage larger than 2 KV (and smaller than 6 KV) passes through the inductor (L1, L2, L3) of the surge protection circuit unit 3, an electric arc is generated at the gap (GAP) so as to bypass the surge voltage. A surge voltage less than 2 KV present in the video signal and the distributed video signal can be filtered by the capacitors (C1, C2, C6, C7) of the splitter circuit 21.

Figure 4:
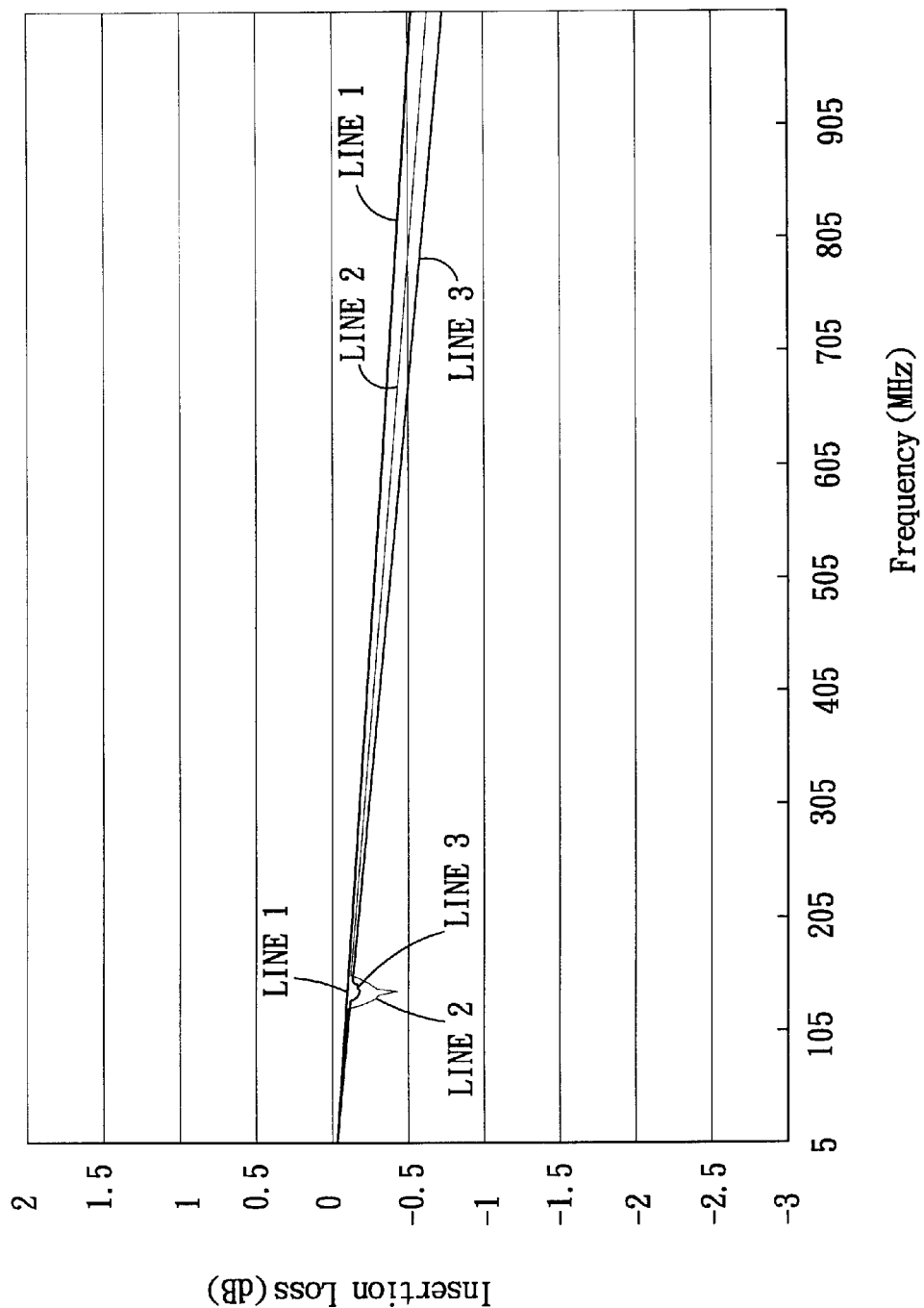
FIG. 4 is a frequency response plot for embodiments of a conventional directional tap and a directional tap according to the present invention.

In this embodiment, each of the surge protection circuit units 3 further includes a resistor (R1, R2, R3) connected to the inductor (L1, L2, L3) in parallel so as to reduce the resonant Q value of the inductor (L1, L2, L3). FIG. 4 illustrates the frequency responses of a conventional directional tap, and the embodiments of the directional tap according to the present invention. In FIG. 4, Line 1 represents the frequency response of the conventional directional tap, Line 2 represents the frequency response of the embodiment of the directional tap where only the inductor is applied in the surge protection circuit unit 3, and Line 3 represents the frequency response of the embodiment of the directional tap shown in FIG. 3. It is evident that a notch generated at about 135 MHz in the Line 2 can be improved by the addition of the resistor as indicated in the Line 3.

It is noted that, due to the presence of the surge protection circuit units 3 that consist of inductors and resistors, the directional tap of the present invention can provide the surge protection function. at relatively low costs. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A directional tap, comprising:

input and output ports adapted to be connected electrically to a cable television network for receiving and outputting a video signal;

a splitting circuit having an input connected electrically to said input port, an output connected electrically to said output port, and a plurality of directional output ends, said splitting circuit receiving the video signal from said input port and outputting a distributed video signal corresponding to the video signal from said input port at each of said directional output ends;

a plurality of directional output terminals, each of which is connected electrically to a respective one of said directional output ends for outputting the distributed video signal to a client end; and a plurality of surge protection circuit units, one of which is connected between said input port and said input of said splitting circuit, the remaining ones of which are connected between a respective one of said directional output ends of said splitting circuit and a respective one of said directional output terminals, said surge protection circuit units bypassing surge voltages present in the video signal and the distributed video signal, each of said surge protection circuit units including an inductor having a first terminal connected electrically to said splitting circuit, and a second terminal cooperating with a ground terminal to define a gap.

2. The directional tap as claim in claim 1, wherein said gap is a 1.2±0.5 mm gap.

3. The directional tap as claimed in claim 1, wherein each of said surge protection circuit units further includes a resistor that is connected to said inductor in parallel.

* * * * *